US012052638B2

United States Patent
Miklós et al.

(10) Patent No.: US 12,052,638 B2
(45) Date of Patent: Jul. 30, 2024

(54) REPORTING OF MULTICAST MAC ADDRESSES

(71) Applicant: Telefonaktiebolaget LM Ericsson (publ), Stockholm (SE)

(72) Inventors: György Miklós, Pilisborosjenö (HU); János Farkas, Kecskemét (HU); Balázs Varga, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 474 days.

(21) Appl. No.: 17/416,033

(22) PCT Filed: Dec. 13, 2019

(86) PCT No.: PCT/IB2019/060778
§ 371 (c)(1),
(2) Date: Jun. 18, 2021

(87) PCT Pub. No.: WO2020/128751
PCT Pub. Date: Jun. 25, 2020

(65) Prior Publication Data
US 2022/0070625 A1    Mar. 3, 2022

Related U.S. Application Data

(60) Provisional application No. 62/781,853, filed on Dec. 19, 2018.

(51) Int. Cl.
*H04W 4/06* (2009.01)
*H04L 12/18* (2006.01)
(Continued)

(52) U.S. Cl.
CPC ........... *H04W 4/06* (2013.01); *H04L 12/4641* (2013.01); *H04L 67/146* (2013.01)

(58) Field of Classification Search
CPC .... H04W 4/06; H04L 12/4641; H04L 67/146; H04L 12/189
(Continued)

(56) References Cited

U.S. PATENT DOCUMENTS

| | | | |
|---|---|---|---|
| 2007/0097971 A1* | 5/2007 | Jang ................... | H04L 61/5069 370/312 |
| 2017/0155599 A1* | 6/2017 | Vobbilisetty ............ | H04L 49/70 |
| 2018/0338265 A1* | 11/2018 | Goel ........................ | H04L 45/02 |
| 2019/0281492 A1* | 9/2019 | Hans ................... | H04L 47/2475 |

OTHER PUBLICATIONS

3GPP TS 23.501 V15.3.0 (Sep. 2018) (Year: 2018).*
3GPP TS 23.501 V15.4.0 (Dec. 2018) (Year: 2018).*
SA WG2 Meeting #127bis we 185619 May 28-Jun. 1, 2018, Newport Beach, USA. Source: Huawei, HISHicon THies Update Solution for IPTV support (Year: 2018).*
(Continued)

*Primary Examiner* — Inder P Mehra
(74) *Attorney, Agent, or Firm* — Sage Patent Group

(57) ABSTRACT

Systems and methods are disclosed herein that relate to reporting a multicast Medium Access Control (MAC) address used by a particular Protocol Data Unit (PDU) session in a cellular communications system. In some embodiments, a method performed in a core network of a cellular communications system comprises, at a User Plane Function (UPF), obtaining multicast MAC address information comprising a multicast MAC address to be used on a particular PDU session and information that identifies either or both of a User Equipment (UE) associated with the particular PDU session and the particular PDU session and reporting, to a Session Management Function (SMF), use of the multicast MAC address on the particular PDU session. The method further comprises, at the SMF, receiving the report from the UPF, and using the multicast MAC address to perform one or more operational tasks.

15 Claims, 7 Drawing Sheets

(51) Int. Cl.
*H04L 12/46* (2006.01)
*H04L 67/146* (2022.01)

(58) Field of Classification Search
USPC .......................................................... 370/312
See application file for complete search history.

(56) References Cited

OTHER PUBLICATIONS

Author Unknown, "Technical Specification Group Services and System Aspects; System Architecture for the 5G System; Stage 2 (Release 15)," Technical Specification 23.501, Version 15.3.0, 3GPP Organizational Partners, Sep. 2018, 226 pages.

Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.

Author Unknown, "IEEE Standard for Local and mtropolitan area networks—Frame Replication and Elimination for Reliability," IEEE Computer Society, IEEE Std 802.1CB, 2017, 102 pages.

Huawei, et al., "S2-185619: Update Solution for IPTV support," Third Generation Partnership Project (3GPP), SA WG2 Meeting #127bis, May 28-Jun. 1, 2018, 6 pages, Newport Beach, USA.

International Search Report and Written Opinion for International Patent Application No. PCT/IB2019/060778, mailed Mar. 16, 2020, 15 pages.

\* cited by examiner

REPORTING OF MULTICAST MAC ADDRESSES

RELATED APPLICATIONS

This application is a 35 U.S.C. § 371 national phase filing of International Application No. PCT/IB2019/060778, filed Dec. 13, 2019, which claims the benefit of provisional patent application Ser. No. 62/781,853, filed Dec. 19, 2018, the disclosures of which are hereby incorporated herein by reference in their entireties.

TECHNICAL FIELD

The present disclosure relates to a cellular communications system and, in particular, a cellular communications system that supports Ethernet Protocol Data Unit (PDU) sessions.

BACKGROUND

Fifth Generation (5G) mobile networks also support Ethernet traffic. The 5G network supports so-called Ethernet Protocol Data Unit (PDU) sessions, which can carry native Ethernet frames over the 5G mobile network. In case of Ethernet PDU sessions, the source Medium Access Control (MAC) address used at the terminal, or User Equipment (UE), side can be reported from the User Plane Function (UPF) to the Session Management Function (SMF). Whether or not to report the MAC address is controlled by the SMF. Note that there may be multiple MAC addresses used as source address, e.g., because there may be multiple Ethernet devices behind the UE that use the given PDU session. The UPF also reports the removal of the MAC address, i.e., when the MAC address has not been used over a given period of time. The reporting of the MAC address is defined in Third Generation Partnership Project (3GPP) Technical Specification (TS) 23.501 V15.3.0 section 5.8.2.12. Note that other information, such as Virtual Local Area Network (VLAN) tags, may also be reported in combination with the MAC addresses.

FIG. 1 illustrates reporting of MAC addresses as currently defined in 3GPP TS 23.501 V15.3.0 section 5.8.2.12. As illustrated, the 3GPP 5G System (5GS) includes a UE connected to a next generation Node B (gNB) that forms part of the 5G Radio Access Network (RAN). The gNB is connected to a 5G Core (5GC), which includes a UPF, an Access and Mobility Function (AMF), a SMF, a Policy and Charging Function (PCF), etc. The UPF is connected to an Ethernet network via a switch. This switch may be co-located with the UPF or separate from the UPF. The MAC address used at the UE side (by Ethernet Host A) is reported from the UPF to the SMF.

The MAC address reporting may be used by the SMF to further report to the PCF so that the PCF can install appropriate packet filters based on the MAC address information. The reporting may also be used by the SMF to install packet filters that map downlink traffic to the given PDU session, in case the UPF does not set up such packet filters autonomously. The MAC address reporting may also be used for other purposes such as to prepare for the possible relocation of the UPF, so that the MAC address information can be conveyed to the new target UPF.

SUMMARY

Systems and methods are disclosed herein that relate to reporting a multicast Medium Access Control (MAC) address used by a particular Protocol Data Unit (PDU) session in a cellular communications system. In some embodiments, a method performed in a core network of a cellular communications system for mapping a multicast MAC address to a particular PDU session comprises, at a User Plane Function (UPF), obtaining multicast MAC address information comprising a multicast MAC address to be used on a particular PDU session and information that identifies either or both of a User Equipment (UE) associated with the particular PDU session and the particular PDU session. The method further comprises, at the UPF, reporting, to a Session Management Function (SMF) in the core network, use of the multicast MAC address on the particular PDU session. The method further comprises, at the SMF, receiving, from the UPF, the report of the use of the multicast MAC address on the particular PDU session, the report comprising the multicast MAC address to be used on the particular PDU session and using the multicast MAC address to perform one or more operational tasks. In this manner, it becomes possible to selectively use multicast MAC addresses on specific PDU sessions as destination addresses. This can enable the use of mechanisms such as Institute of Electrical and Electronics Engineers (IEEE) Time-Sensitive Networking (TSN) Frame Replication and Elimination for Reliability (FRER) for redundancy. The reporting of the MAC address may enable the setup of specific policy, Quality of Service (QoS), or charging filters so that the traffic flows are treated appropriately. The reporting of the multicast MAC address may also enable the potential relocation of the UPF, so that the SMF can provide the multicast MAC address information to the target UPF and the traffic flows can continue after mobility.

Embodiments of a method performed in a UPF and corresponding embodiments of a UPF or network node implementing a UPF are also disclosed. In some embodiments, a method performed in a User Plane Function, UPF, (314) for mapping a multicast MAC address to a particular PDU session in a core network of a cellular communications system comprise obtaining multicast MAC address information comprising a multicast MAC address to be used on a particular PDU session and information that identifies either or both of a UE associated with the particular PDU session and the particular PDU session. The method further comprises reporting, to a SMF in the core network, use of the multicast MAC address on the particular PDU session.

In some embodiments, reporting the use of the multicast MAC address on the particular PDU session comprises reporting, to the SMF, the multicast MAC address to be used on the particular PDU session. In some other embodiments, reporting the use of the multicast MAC address on the particular PDU session comprises reporting, to the SMF, the multicast MAC address to be used on the particular PDU session and either or both of the information that identifies the UE associated with the particular PDU session and the particular PDU session.

In some embodiments, the multicast MAC address information further comprises one or more Virtual Local Area Network (VLAN) tags.

In some embodiments, the information that identifies either or both of the UE associated with the particular PDU session and the particular PDU session comprises: (a) either or both of: (i) one or more unicast MAC addresses associated with the UE (212) and (ii) an identifier of the particular PDU session; (b) the identifier of the particular PDU session; (c) an identifier of the UE (212) associated with the particular PDU session; or (d) any combination of two or more of (a)-(c).

In some embodiments, the UPF is coupled to an Ethernet network via a switch (500). In some embodiments, the switch is non-co-located with the UPF, and obtaining the multicast MAC address information comprises obtaining the multicast MAC address information from the switch. In some embodiments, obtaining the multicast MAC address information from the switch comprises receiving, from the switch, a control message comprising the multicast MAC address information. In some other embodiments, the switch is co-located with the UPF, and obtaining the multicast MAC address information comprises obtaining the multicast MAC address information from the switch.

In some embodiments, the method further comprises storing the multicast MAC address information.

In some embodiments, a UPF for mapping a multicast MAC address to a particular PDU session in a core network of a cellular communications system is adapted to obtain multicast MAC address information comprising a multicast MAC address to be used on a particular PDU session and information that identifies either or both of a UE associated with the particular PDU session and the particular PDU session. The UPF is further adapted to report, to a SMF in the core network, use of the multicast MAC address on the particular PDU session.

In some embodiments, a network node implementing a UPF for mapping a multicast MAC address to a particular PDU session in a core network of a cellular communications system comprises at least one network interface and processing circuitry associated with the at least one network interface. The processing circuity is configured to cause the network node to obtain multicast MAC address information comprising a multicast MAC address to be used on a particular PDU session and information that identifies either or both of a UE associated with the particular PDU session and the particular PDU session. The processing circuity is further configured to cause the network node to report, to a SMF in the core network, use of the multicast MAC address on the particular PDU session.

Embodiments of a method performed in a SMF and corresponding embodiments of an SMF and network node that implements an SMF are also disclosed. In some embodiments, a method performed in a SMF for mapping a multicast MAC address to a particular PDU session in a core network of a cellular communications system comprises receiving, from a UPF in the core network, information that reports use of a multicast MAC address on a particular PDU session. The information that reports use of the multicast MAC address on the particular PDU session comprises the multicast MAC address. The method further comprises using the information that reports use of the multicast MAC address on the particular PDU session to perform one or more operational tasks.

In some embodiments, the information that reports use of the multicast MAC address on the particular PDU session comprises the multicast MAC address to be used on the particular PDU session and information that identifies either or both of a UE associated with the particular PDU session and the particular PDU session. In some embodiments, the information that identifies either or both of the UE associated with the particular PDU session and the particular PDU session comprises: (a) either or both of: (i) one or more unicast MAC addresses associated with the UE and (ii) an identifier of the particular PDU session; (b) the identifier of the particular PDU session; (c) an identifier of the UE associated with the particular PDU session; or (d) any combination of two or more of (a)-(c).

In some embodiments, using the information that reports use of the multicast MAC address on the particular PDU session comprises providing one or more policy and charging filters to the UPF based on the information that reports use of the multicast MAC address on the particular PDU session. In some embodiments, the one or more policy and charging filters comprise one or more filters that map frames having the multicast MAC address to the particular PDU session.

In some embodiments, using the information that reports use of the multicast MAC address on the particular PDU session comprises storing the information that reports use of the multicast MAC address on the particular PDU session.

In some embodiments, using the information that reports use of the multicast MAC address on the particular PDU session comprises providing the information that reports use of the multicast MAC address on the particular PDU session to a new UPF in association with a UPF relocation procedure.

In some embodiments, the information that reports use of the multicast MAC address on the particular PDU session further comprises one or more VLAN tags.

In some embodiments, a SMF for mapping a multicast MAC address to a particular PDU session in a core network of a cellular communications system is adapted to receive, from a UPF in the core network, information that reports use of a multicast MAC address on a particular PDU session. The information that reports use of the multicast MAC address on the particular PDU session comprises the multicast MAC address. The SMF is further adapted to use the information that reports use of the multicast MAC address on the particular PDU session to perform one or more operational tasks.

In some embodiments, a network node implementing a SMF for mapping a multicast MAC address to a particular PDU session in a core network of a cellular communications system comprises at least one network interface and processing circuitry associated with the at least one network interface. The processing circuity is configured to cause the network node to receive, from a UPF in the core network, information that reports use of a multicast MAC address on a particular PDU session. The information that reports use of the multicast MAC address on the particular PDU session comprises the multicast MAC address. The processing circuity is further configured to cause the network node to use the information that reports use of the multicast MAC address on the particular PDU session to perform one or more operational tasks.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
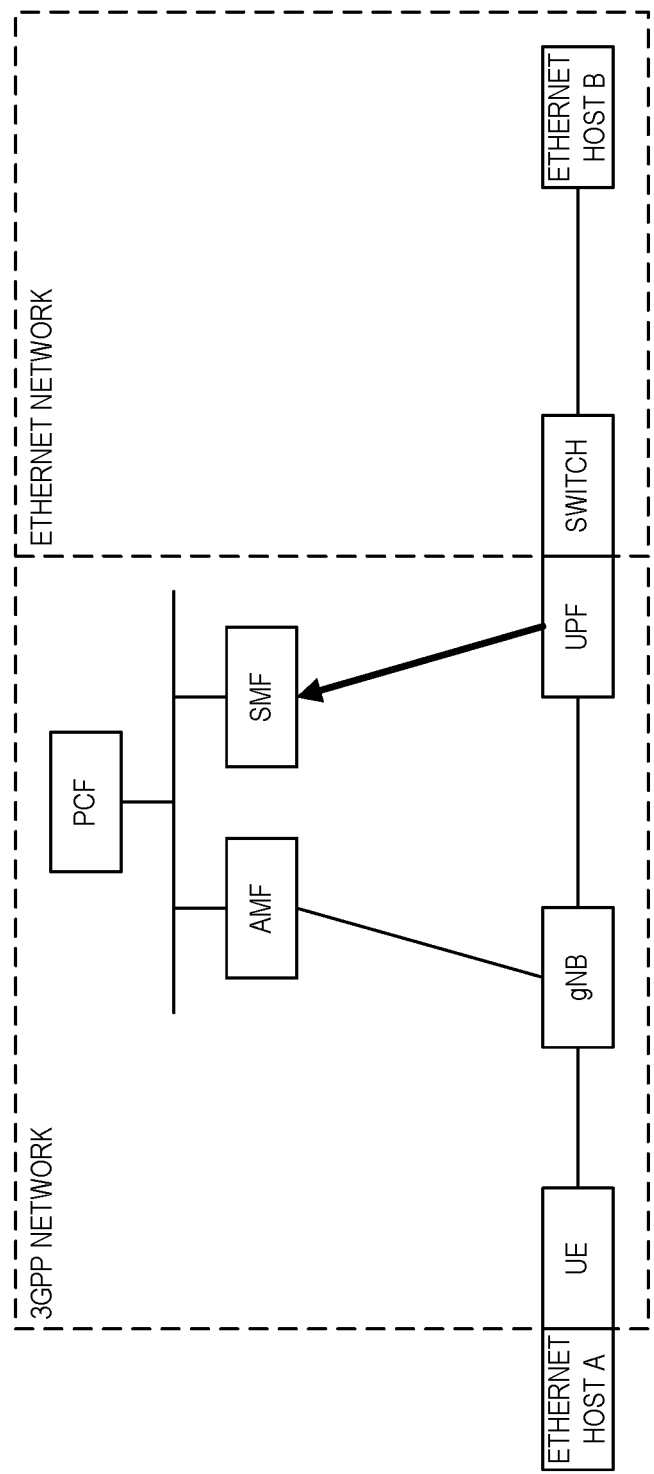
FIG. 1 illustrates reporting of Medium Access Control (MAC) addresses as currently defined in Third Generation Partnership Project (3GPP) Technical Specification (TS) 23.501 V15.3.0 section 5.8.2.12.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy and Charging Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s). The current solution for Medium Access Control (MAC) address reporting in the 5G System (5GS) only reports unicast addresses that are used at the terminal side. Multicast or broadcast traffic may be forwarded towards the terminal, but its address is not specifically reported.

The current solution may cause problems in cases when there is an explicitly configured multicast MAC address to be used on a given Protocol Data Unit (PDU) session, so that we would like to avoid forwarding traffic with the given multicast MAC address to other PDU sessions. Currently, there is no way to bind a multicast MAC address to a specific PDU session, unless that multicast MAC address is explicitly configured into or signaled to the SMF or PCF. However, typically such an explicit configuration is not available at the SMF or PCF. Instead, the need for using a given multicast MAC address would arise in the Ethernet data network, which typically does not have any signaling interface to the SMF or PCF. The information on the multicast MAC address to be used would be typically available at the switch co-located with the UPF, or the switch used in combination with the UPF. There are situations, e.g., in case of using IEEE Time-Sensitive Networking (TSN) Frame Replication and Elimination for Reliability (FRER) (IEEE 802.1CB), when an explicitly configured multicast address is used. For example, for FRER, a central controller would use the same multicast MAC address on the two (or more) legs of the redundant data transmission. That multicast MAC address would be used only as a destination address for the data traffic towards the UE, but not used by the UE as the source address. The traffic with the given multicast address is intended to the UE only, and should not be forwarded to other UEs. Another example is optimizing the flooding of multicast traffic. Flooding only to where we have receivers is an existing optimization issue in Ethernet networks. Explicitly configured multicast addresses help reduce unnecessary flooding.

With the current 3GPP solution, there is no good way to map such traffic to a given multicast MAC address to specific PDU sessions. Also, if multicast MAC addresses are not reported, they would also not be available at the SMF to be used for UPF relocation. In case of UPF relocation, the SMF provides the relevant Ethernet context to the new target UPF, including MAC addresses used over the given PDU session.

Certain aspects of the present disclosure and their embodiments may provide solutions to the aforementioned or other challenges. In some embodiments, when the UPF becomes aware of an explicitly configured multicast MAC address to be used on a given PDU session, that MAC address is also reported to the SMF similarly as unicast MAC addresses. The UPF may become aware of such explicitly configured multicast MAC addresses based on information that it receives from its associated Ethernet switch. That associated switch may either be co-located with the UPF or non-co-located with the UPF, where the UPF and switch have an explicit signaling relationship.

In some embodiments, when the use of a multicast MAC address is explicitly configured into a switch that is associated with a 3GPP UPF, the UPF reports the use of the given multicast MAC address to the SMF.

Certain embodiments may provide one or more of the following technical advantage(s). When using embodiments of the present disclosure, it becomes possible to selectively use multicast MAC addresses on specific PDU sessions as destination addresses. This can enable the use of mechanisms such as IEEE TSN FRER for redundancy. The reporting of the MAC address enables the setup of specific policy, Quality of Service (QoS), or charging filters so that the traffic flows are treated appropriately. The reporting of the multicast MAC address also enables the potential relocation of the UPF, so that the SMF can provide the multicast MAC address information to the target UPF and the traffic flows can continue after mobility.

Figure 2:
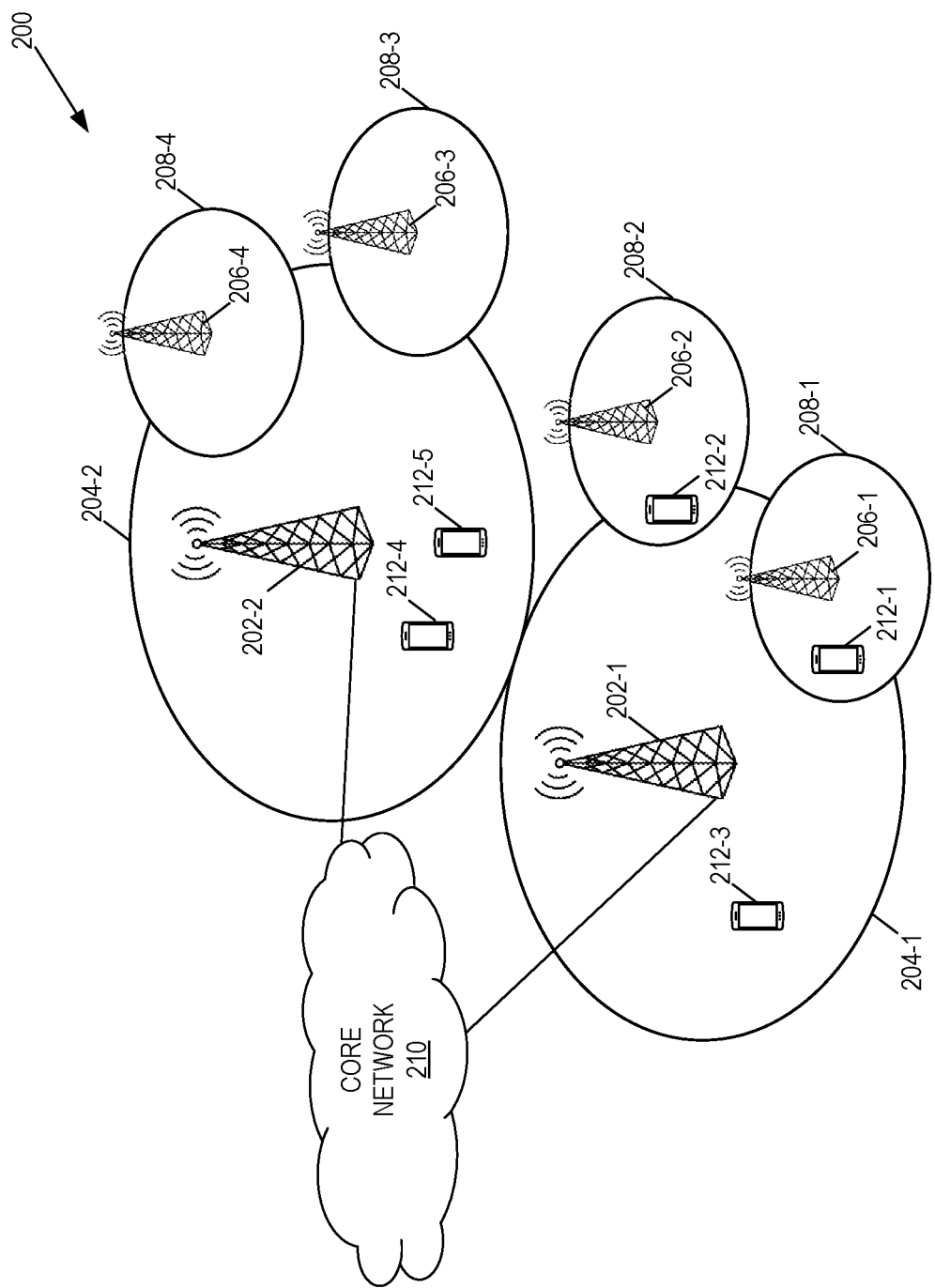
FIG. 2 illustrates one example of a cellular communications network in which embodiments of the present disclosure may be implemented.

Systems and methods are disclosed herein that are implemented in a cellular communications network such as, e.g., a 3GPP 5G network. Note, however, that the present disclosure is not limited to 3GPP 5G networks. Rather, the embodiments disclosed herein are equally applicable to other types of cellular communications networks. In this regard, FIG. 2 illustrates one example of a cellular communications network 200 in which embodiments of the present disclosure may be implemented. In the embodiments described herein, the cellular communications network 200 is a 5G NR network. In this example, the cellular communications network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210, which for 5G is the 5G Core (5GC).

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Note that while the example of FIG. 2 illustrates cellular access to the core network 210 (e.g., 3GPP access to the 5GC), the present disclosure is also applicable to non-cellular access to the core network 210 (e.g., non-3GPP access to the 5GC).

Figure 3:
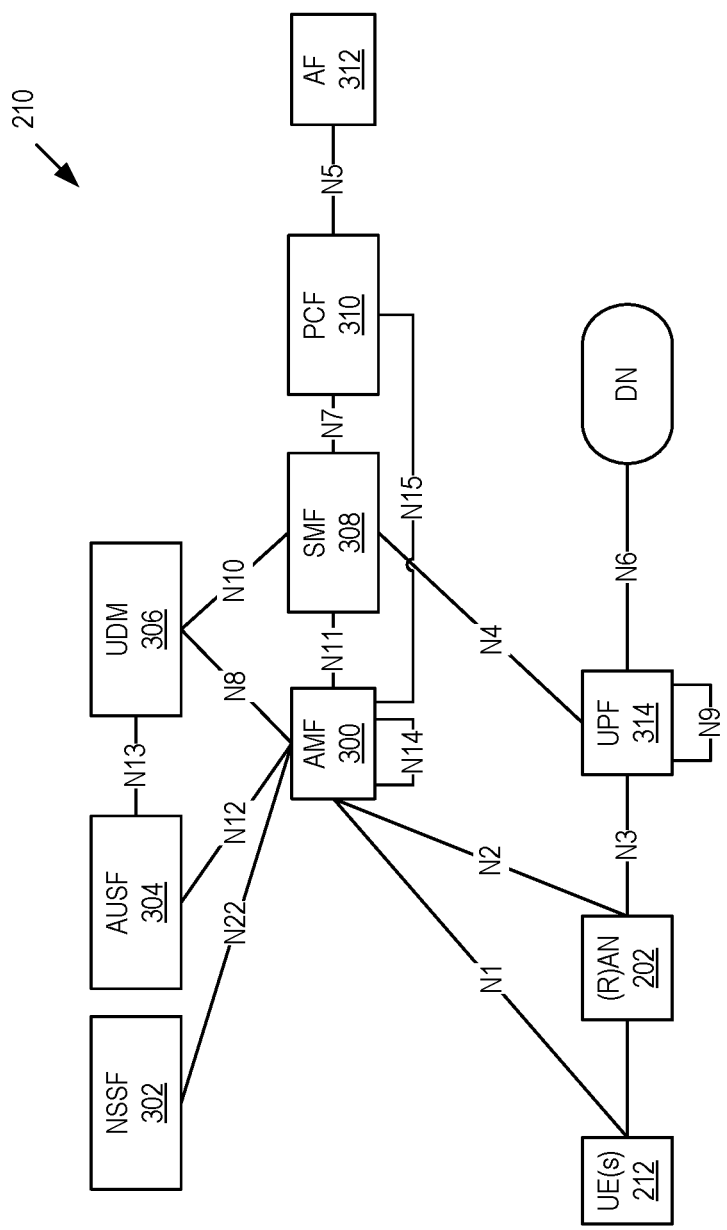
FIG. 3 illustrates one example of the cellular communications network of FIG. 2 represented as a Fifth Generation (5G) network architecture composed of core Network Functions (NFs), where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/ interface. FIG. 3 can be viewed as one particular implementation of the system 200 of FIG. 2.

Seen from the access side the 5G network architecture shown in FIG. 3 comprises a plurality of UEs 212 connected to either a RAN or an Access Network (AN) as well as an AMF 300. Typically, the R(AN) comprises base stations 202, e.g. such as eNBs or gNBs or similar. Seen from the core network side, the 5GC NFs shown in FIG. 3 include an NSSF 302, an AUSF 304, a UDM 306, the AMF 300, a SMF 308, a PCF 310, an Application Function (AF) 312, and a UPF 314.

Reference point representations of the 5G network architecture are used to develop detailed call flows in the normative standardization. The N1 reference point is defined to carry signaling between the UE 212 and the AMF 300. The reference points for connecting between the AN and the AMF 300 and between the AN and the UPF 314 are defined as N2 and N3, respectively. There is a reference point, N11, between the AMF 300 and the SMF 308. N4 is used by the SMF 308 and the UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and the SMF 308, respectively. N12 is required for the AMF 300 to perform authentication of the UE 212. N8 and N10 are defined because the subscription data of the UE is required for the AMF 300 and the SMF 308.

The 5GC network aims at separating user plane and control plane. The user plane carries user traffic while the control plane carries signaling in the network. In FIG. 3, the UPF 314 is in the user plane and all other NFs, i.e., the AMF 300, SMF 308, PCF 310, AF 312, NSSF 302, AUSF 304, and UDM 306, are in the control plane. Separating the user and control planes guarantees each plane resource to be scaled independently. It also allows UPFs 314 to be deployed separately from control plane functions in a distributed fashion. In this architecture, UPFs 314 may be deployed very close to UEs 212 to shorten the Round Trip Time (RTT) between UEs 212 and data network for some applications requiring low latency.

The core 5G network architecture is composed of modularized functions. For example, the AMF 300 and SMF 308 are independent functions in the control plane. Separated AMF 300 and SMF 308 allow independent evolution and scaling. Other control plane functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 314.

Figure 4:
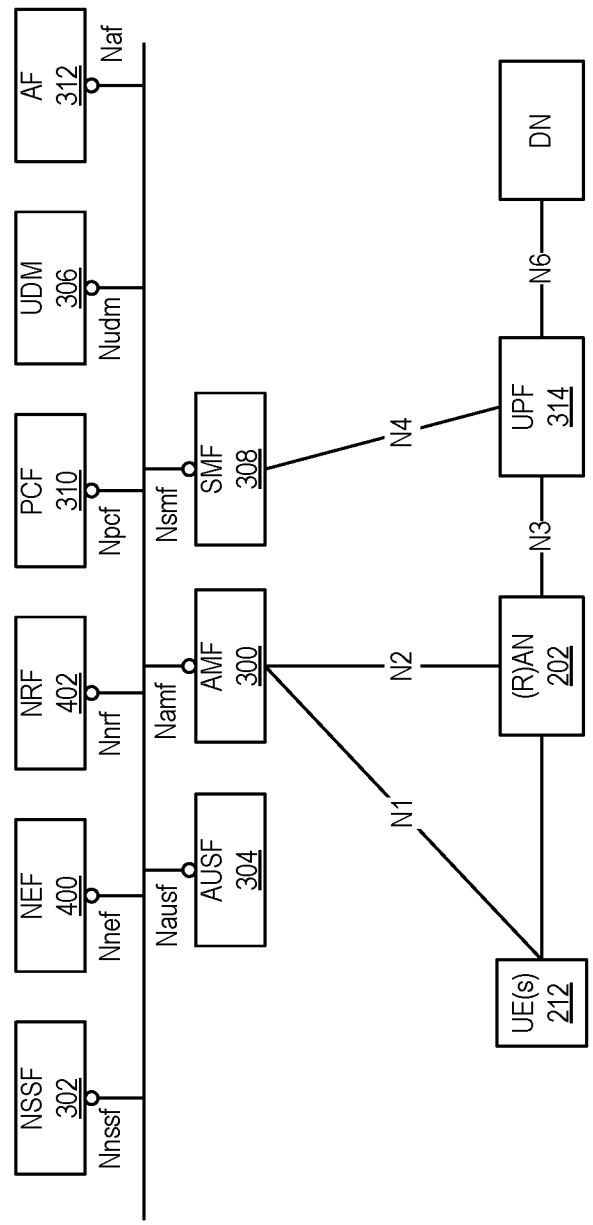
FIG. 4 illustrates a 5G network architecture using service-based interfaces between the NFs in the control plane, instead of the point-to-point reference points/interfaces used in the 5G network architecture of FIG. 3.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs 212. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support QoS. Based on the information, the PCF 310 determines policies about mobility and session management to make the AMF 300 and SMF 308 operate properly. The AUSF 304 supports authentication function for UEs 212 or similar and thus stores data for authentication of UEs 212 or similar while the UDM 306 stores subscription data of the UE 212. The Data Network (DN), which is not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Now the present disclosure turns to a more detailed description of some embodiments of the present disclosure. In some embodiments, when the UPF 314 becomes aware of an explicitly configured multicast MAC address to be used on a given PDU session, that MAC address is also reported to the SMF 308 similarly as unicast MAC addresses. The UPF 314 may become aware of such explicitly configured multicast MAC addresses based on information that it receives from its associated Ethernet switch. That associated switch may either be co-located with the UPF 314 or non-co-located with the UPF, where the UPF 314 and switch have an explicit signaling relationship.

Figure 5:
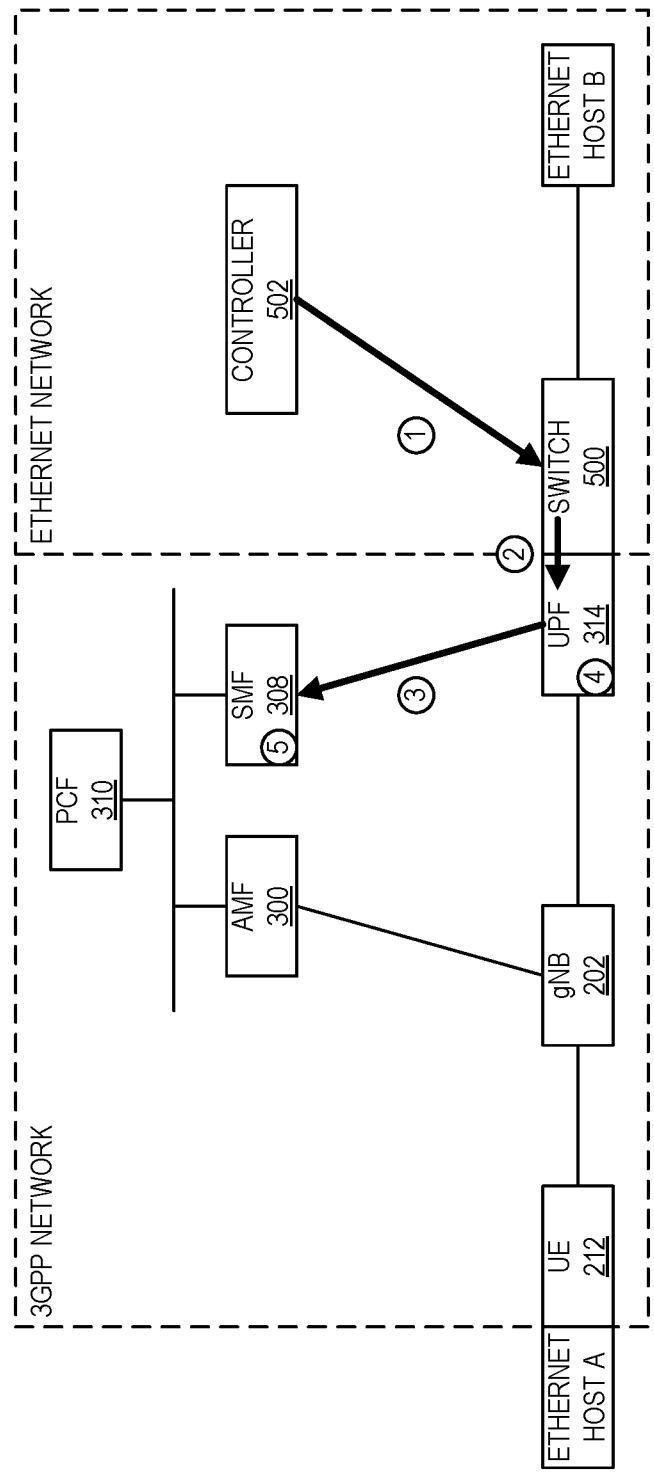
FIG. 5 illustrates multicast MAC address reporting in accordance with some embodiments of the present disclosure.

FIG. 5 illustrates multicast MAC address reporting in accordance with some embodiments of the present disclosure. The illustrated 3GPP network is one example of the cellular communications network 200. As illustrated, the solution consists of the following steps. Note that while the following functions are referred to as "steps," these "steps" may be performed in any desired order (or even simultaneously) unless otherwise required.

Step 1: A multicast MAC address is configured to be used at a switch 500 in the Ethernet network, where the switch 500 is associated with a UPF 314 in the 3GPP network. The configuration may be performed, e.g., by a central controller 502 (such as, e.g., a Central Network Controller (CNC) of an IEEE TSN), or by the use of a configuration protocol, or other methods (e.g., Internet Group Management Protocol (IGMP) snooping). This multicast MAC address applies to a particular PDU session (or two or more particular PDU sessions) in the 3GPP network.

Step 2: The switch 500 is associated with the UPF 314 and provides multicast MAC address information to the UPF 314. In some embodiments, the UPF 314 is co-located with the switch 500, and the provision of the multicast MAC address takes place internally within the node in which the UPF 314 and the switch 500 are co-located, in which case the multicast MAC address information is, e.g., sent from the switch 500 to the co-located UPF 314. In some other embodiments, the UPF 314 and the switch 500 are separate nodes (i.e., non-co-located), and an explicit control message is sent from the switch 500 to the UPF 314, where this control message includes the multicast MAC address information. In either case, the multicast MAC address information provided by the switch 500 to the UPF 314 includes:

1. the multicast MAC address that applies to the particular PDU session in the 3GPP network, and
2. information that identifies:
   a. a UE 212 associated with the PDU session to which the multicast MAC address applies, and/or
   b. the particular PDU session to which the multicast MAC address applies.

This information that identifies the UE 212 and/or the particular PDU session may include (one or more) unicast MAC address that is used on the PDU session of the UE 212, an identifier of the PDU session (e.g., a local identifier used between the UPF 314 and the switch 500), and/or an identifier of the UE 212 (e.g., the International Mobile Subscriber Identity (IMSI) or an IP address of the UE 212). In addition, the multicast MAC address information may include one or more Virtual Local Area Network (VLAN) tags associated with the multicast MAC address, if applicable.

Note that, in step 2, the switch 500 may provide, to the UPF 314, separate multicast MAC address information for multiple PDU sessions or multiple UEs simultaneously (e.g., in the same control message).

Step 3: The UPF 314 reports the use of the given multicast MAC address on the given PDU session to the SMF 308. In some embodiments, this reporting is done in a manner that is similar to the manner in which the UPF 314 reports the use of a MAC address on a PDU session (e.g., as described in 3GPP Technical Specification (TS) 23.501 V15.3.0 section 5.8.2.12). For instance, the UPF 314 may report (e.g., send) the multicast MAC address for the particular PDU session to the SMF 308 (e.g., by sending a message comprising the respective multicast MAC address information, or relevant portion thereof, to the SMF 308). The UPF 314 may also report one or more VLAN tags in combination with the multicast MAC address when applicable.

Step 4 (optional): The UPF 314 may optionally store the multicast MAC address information on its own.

Step 5: In response to the multicast MAC address reporting, the SMF 308 uses the reported multicast MAC address (and optionally any associated information such as, e.g., VLAN tags) to perform one or more actions. More specifically, the SMF 308 may:

use the reported information to provide additional policy or charging filters to the UPF 314, where this may include filters to map the frames to the given PDU session when such filters are not automatically installed in the UPF 314;

store the multicast MAC address and associated information;

report the reported information to the NEF (not shown); and/or provide the reported information to a new UPF in case of UPF relocation.

In case the multicast MAC address is released and no longer used, a procedure similar to that discussed above can be used to report this change to the SMF 308.

In the description above, the multicast MAC address is used for a single PDU session; however, the present disclosure is not limited thereto. The multicast MAC address may be applied to any number of one or more particular PDU sessions where the reported multicast MAC address information includes both the multicast MAC address and information that indicates the one or more particular PDU session to which the multicast MAC address applies.

As a result of the explicit configuration of the multicast MAC address, frames with the given multicast MAC address as the destination are only forwarded to the particular PDU session(s) for which they have explicitly been configured, and not to other PDU sessions. Of course, the switch may forward multicast frames on other fixed interfaces as today.

Note that there may also be multicast MAC addresses used in the system which are not explicitly configured or learned by a signaling protocol (e.g., via snooping). Such multicast frames may be delivered on multiple or all PDU sessions, depending on configuration. The use of such multicast MAC addresses might not be explicitly reported to the SMF 308. Local configuration may be used to select which types of multicast MAC addresses are reported (e.g., depending on how the multicast MAC address was configured/learned).

As an optional extension, it may be possible to also report, in combination with the multicast MAC address, information on how the multicast MAC address was configured (e.g., whether it was configured by the central controller 502 (whose identity might also be given), whether it was set by IGMP snooping, etc.). This information may help the SMF 308 and/or the PCF 310 to determine the most appropriate set of policy and charging information to be provided for the traffic.

Figure 6:
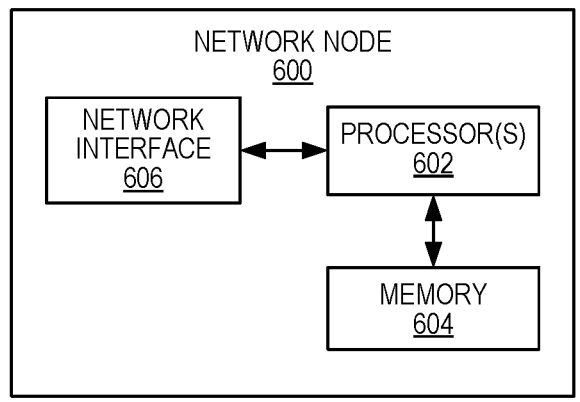
FIGS. 6 through 8 illustrate example embodiments of a network node.

FIG. 6 is a schematic block diagram of a network node 600 according to some embodiments of the present disclosure. The network node 600 may be, for example, a core network node (e.g., a node implementing the UPF 314 or SMF 308 of FIG. 5). As illustrated, the network node 600 includes one or more processors 602 (e.g., Central Processing Units (CPUs), Application Specific Integrated Circuits (ASICs), Field Programmable Gate Arrays (FPGAs), and/or the like), memory 604, and a network interface 606. The one or more processors 602 are also referred to herein as processing circuitry. The one or more processors 602 operate to provide one or more functions of a network node 600 as described herein (e.g., with respect to FIG. 5). In some embodiments, the function(s) are implemented in software that is stored, e.g., in the memory 604 and executed by the one or more processors 602.

Figure 7:
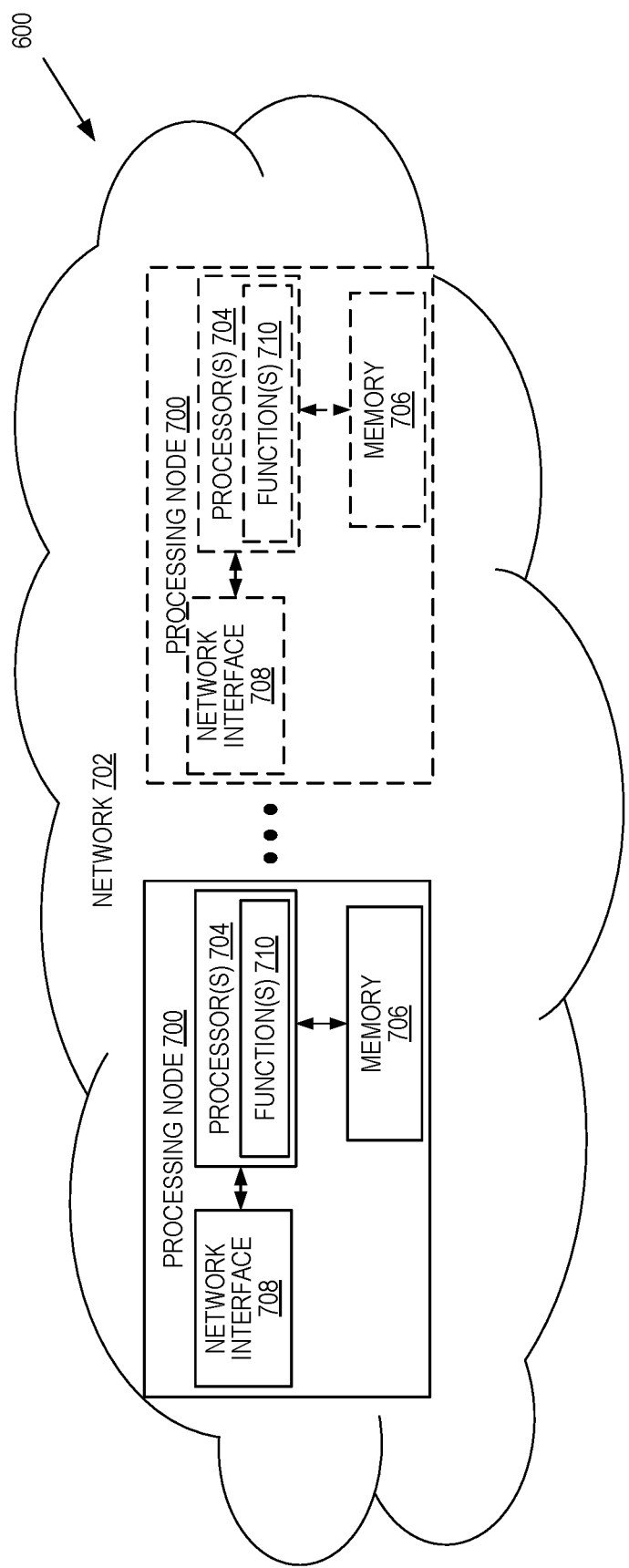

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702. Each processing node 700 includes one or more processors 704 (e.g., CPUs, ASICs, FPGAs, and/or the like), memory 706, and a network interface 708. In this example, functions 710 of the network node 600 described herein (e.g., with respect to FIG. 5) are implemented at the one or more processing nodes 700 or distributed across the two or more processing nodes 700 in any desired manner. In some particular embodiments, some or all of the functions 710 of the network node 600 described herein are implemented as virtual components executed by one or more virtual machines implemented in a virtual environment(s) hosted by the processing node(s) 700.

In some embodiments, a computer program including instructions which, when executed by at least one processor, causes the at least one processor to carry out the functionality of network node 600 or a node (e.g., a processing node 700) implementing one or more of the functions 710 of network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
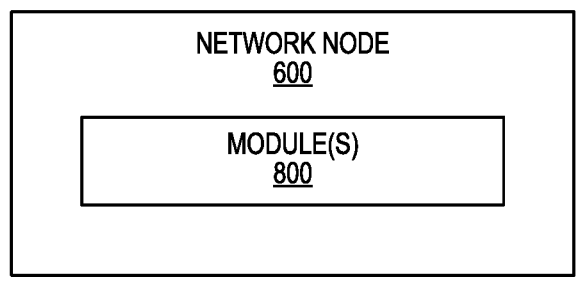

FIG. 8 is a schematic block diagram of the network node 600 according to some other embodiments of the present disclosure. The radio access node 600 includes one or more modules 800, each of which is implemented in software. The module(s) 800 provide the functionality of the network node 600 described herein (e.g., the functions of the UPF 314 or the functions of the SMF 308 described above with respect to, e.g., FIG. 5). This discussion is equally applicable to the processing node 700 of FIG. 7 where the modules 800 may be implemented at one of the processing nodes 700 or distributed across multiple processing nodes 700.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed in a User Plane Function, UPF, for mapping a multicast Medium Access Control, MAC, address to a particular Protocol Data Unit, PDU, session in a core network of a cellular communications system, comprising:
    obtaining multicast MAC address information comprising:
        a multicast MAC address to be used on a particular PDU session; and
        information that identifies:

a User Equipment, UE, associated with the particular PDU session; and/or the particular PDU session; and reporting, to a Session Management Function, SMF, in the core network, use of the multicast MAC address on the particular PDU session.

Embodiment 2: The method of embodiment 1 wherein reporting the use of the multicast MAC address on the particular PDU session comprises reporting, to the SMF, the multicast MAC address to be used on the particular PDU session.

Embodiment 3: The method of embodiment 1 wherein reporting the use of the multicast MAC address on the particular PDU session comprises reporting, to the SMF, the multicast MAC address to be used on the particular PDU session and the information that identifies the UE associated with the particular PDU session and/or the particular PDU session.

Embodiment 4: The method of any one of embodiments 1 to 3 wherein the multicast MAC address information further comprises one or more Virtual Local Area Network, VLAN, tags.

Embodiment 5: The method of any one of embodiments 1 to 4 wherein the information that identifies the UE associated with the particular PDU session and/or the particular PDU session comprises: one or more unicast MAC addresses associated with the UE and/or the particular PDU session; an identifier of the particular PDU session; and/or an identifier of the UE associated with the particular PDU session.

Embodiment 6: The method of any one of embodiments 1 to 5 wherein the UPF is coupled to an Ethernet network via a switch.

Embodiment 7: The method of embodiment 6 wherein the switch is external to (i.e., separate or non-co-located with) the UPF, and obtaining the multicast MAC address information comprises obtaining the multicast MAC address information from the switch.

Embodiment 8: The method of embodiment 7 wherein obtaining the multicast MAC address information from the switch comprises receiving, from the switch, a control message comprising the multicast MAC address information.

Embodiment 9: The method of embodiment 6 wherein the switch is co-located with the UPF, and obtaining the multicast MAC address information comprises obtaining the multicast MAC address information from the switch.

Embodiment 10: The method of any one of embodiments 1 to 9 further comprising storing the multicast MAC address information.

Embodiment 11: A method performed in a Session Management Function, SMF, for mapping a multicast Medium Access Control, MAC, address to a particular Protocol Data Unit, PDU, session in a core network of a cellular communications system, comprising:

receiving, from a User Plane Function, UPF, in the core network, multicast MAC address information comprising:

a multicast MAC address to be used on a particular PDU session; and information that identifies:

a User Equipment, UE, associated with the particular PDU session; and/or the particular PDU session; and using the multicast MAC address information to perform one or more operational tasks.

Embodiment 12: The method of embodiment 11 wherein using the multicast MAC address information comprises providing one or more policy and charging filters to the UPF based on the multicast MAC address information.

Embodiment 13: The method of embodiment 12 wherein the one or more policy and charging filters comprise one or more filters that map frames having the multicast MAC address comprised in the multicast MAC address information to the particular PDU session.

Embodiment 14: The method of any one of embodiments 11 to 13 wherein using the multicast MAC address information comprises storing the multicast MAC address information.

Embodiment 15: The method of any one of embodiments 11 to 13 wherein using the multicast MAC address information comprises providing the multicast MAC address information to a new UPF in association with a UPF relocation procedure.

Embodiment 16: The method of any one of embodiments 11 to 15 wherein the multicast MAC address information further comprises one or more Virtual Local Area Network, VLAN, tags.

Embodiment 17: The method of any one of embodiments 11 to 16 wherein the information that identifies the UE associated with the particular PDU session and/or the particular PDU session comprises: one or more unicast MAC addresses associated with the UE and/or the particular PDU session; an identifier of the particular PDU session; and/or an identifier of the UE associated with the particular PDU session.

Embodiment 18: A core network entity adapted to perform the method of any one of embodiments 1 to 17.

Embodiment 19: A node implementing a core network entity, the node comprising: at least one network interface; and processing circuitry associated with the at least one network interface, the processing circuity configured to cause the node to perform the method of any one of embodiments 1 to 17.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
ASIC Application Specific Integrated Circuit
AUSF Authentication Server Function
CNC Central Network Controller
CPU Central Processing Unit
DN Data Network
DSP Digital Signal Processor
eNB Enhanced or Evolved Node B
FPGA Field Programmable Gate Array
FRER Frame Replication and Elimination for Reliability
gNB Next Generation Node B/New Radio Base Station
HSS Home Subscriber Server
IGMP Internet Group Management Protocol
IMSI Internal Mobile Subscriber Identity
IP Internet Protocol
LTE Long Term Evolution
MAC Medium Access Control
MME Mobility Management Entity MTC Machine Type Communication
NEF Network Exposure Function
NF Network Function
NR New Radio
NRF Network Repository Function
NSSF Network Slice Selection Function
PCF Policy and Charging Function
PDU Protocol Data Unit
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
TS Technical Specification
TSN Time-Sensitive Networking
UDM Unified Data Management
UE User Equipment
UPF User Plane Function
VLAN Virtual Local Area Network Those skilled in the art will recognize improvements and modifications to the embodiments of the present disclosure. All such improvements and modifications are considered within the scope of the concepts disclosed herein.

What is claimed is:

1. A method performed in a User Plane Function (UPF) for mapping a multicast Medium Access Control (MAC) address to a particular Protocol Data Unit (PDU) session in a core network of a cellular communications system, comprising:
    obtaining multicast MAC address information comprising:
        a multicast MAC address to be used on a particular PDU session; and
        information that identifies either or both of a User Equipment
        (UE) associated with the particular PDU session and the particular PDU session; and
    reporting, to a Session Management Function (SMF) in the core network, use of the multicast MAC address on the particular PDU session, wherein the UPF is coupled to an Ethernet network via a switch, and wherein the switch is non-co-located with the UPF, and obtaining the multicast MAC address information comprises obtaining the multicast MAC address information from the switch.

2. The method of claim 1, wherein the multicast MAC address information further comprises one or more Virtual Local Area Network (VLAN) tags.

3. The method of claim 1, wherein the information that identifies either or both of the UE associated with the particular PDU session and the particular PDU session comprises:
    a) either or both of: (i) one or more unicast MAC addresses associated with the UE and (ii) an identifier of the particular PDU session;
    b) the identifier of the particular PDU session;
    c) an identifier of the UE associated with the particular PDU session; or
    d) any combination of two or more of (a)-(c).

4. The method of claim 1, wherein obtaining the multicast MAC address information from the switch comprises receiving, from the switch, a control message comprising the multicast MAC address information.

5. The method of claim 1, wherein the switch is co-located with the UPF, and obtaining the multicast MAC address information comprises obtaining the multicast MAC address information from the switch.

6. The method of claim 1, further comprising storing the multicast MAC address information.

7. A network node implementing a User Plane Function (UPF) for mapping a multicast Medium Access Control (MAC) address to a particular Protocol Data Unit (PDU) session in a core network of a cellular communications system, the network node comprising:
    at least one network interface; and
    processing circuitry associated with the at least one network interface, the processing circuitry configured to cause the network node to:
        obtain multicast MAC address information comprising:
            a multicast MAC address to be used on a particular PDU session; and
            information that identifies either or both of a User Equipment (UE) associated with the particular PDU session and the particular PDU session; and
        report, to a Session Management Function (SMF) in the core network, use of the multicast MAC address on the particular PDU session, wherein the UPF is coupled to an Ethernet network via a switch, and wherein the switch is non-co-located with the UPF, and obtaining the multicast MAC address information comprises obtaining the multicast MAC address information from the switch.

8. A method performed in a Session Management Function (SMF) for mapping a multicast Medium Access Control (MAC) address to a particular Protocol Data Unit (PDU) session in a core network of a cellular communications system, comprising:
    receiving, from a User Plane Function (UPF) in the core network, information that reports use of a multicast MAC address on a particular PDU session, the information that reports use of the multicast MAC address on the particular PDU session comprising the multicast MAC address; and
    using the information that reports use of the multicast MAC address on the particular PDU session to perform one or more operational tasks, wherein using the information that reports use of the multicast MAC address on the particular PDU session comprises providing one or more policy and charging filters to the UPF based on the information that reports use of the multicast MAC address on the particular PDU session.

9. The method of claim 8, wherein the information that reports use of the multicast MAC address on the particular PDU session comprises:
    the multicast MAC address to be used on the particular PDU session; and
    information that identifies either or both of a User Equipment (UE) associated with the particular PDU session and the particular PDU session.

10. The method of claim 9, wherein the information that identifies either or both of the UE associated with the particular PDU session and the particular PDU session comprises:
    a) either or both of: (i) one or more unicast MAC addresses associated with the UE and (ii) an identifier of the particular PDU session;
    b) the identifier of the particular PDU session;
    c) an identifier of the UE associated with the particular PDU session; or
    d) any combination of two or more of (a)-(c).

11. The method of claim 8, wherein the one or more policy and charging filters comprise one or more filters that map frames having the multicast MAC address to the particular PDU session.

12. The method of claim 8, wherein using the information that reports use of the multicast MAC address on the particular PDU session comprises storing the information that reports use of the multicast MAC address on the particular PDU session.

13. The method of claim 8, wherein using the information that reports use of the multicast MAC address on the particular PDU session comprises providing the information that reports use of the multicast MAC address on the particular PDU session to a new UPF in association with a UPF relocation procedure.

14. The method of claim 8, wherein the information that reports use of the multicast MAC address on the particular PDU session further comprises one or more Virtual Local Area Network (VLAN) tags.

15. A network node implementing a Session Management Function (SMF) for mapping a multicast Medium Access Control (MAC) address to a particular Protocol Data Unit (PDU) session in a core network of a cellular communications system, the network node comprising:

at least one network interface; and processing circuitry associated with the at least one network interface, the processing circuitry configured to cause the network node to:

receive, from a User Plane Function (UPF) in the core network, information that reports use of a multicast MAC address on a particular PDU session, the information that reports use of the multicast MAC address on the particular PDU session comprising the multicast MAC address; and use the information that reports use of the multicast MAC address on the particular PDU session to perform one or more operational tasks, wherein using the information that reports use of the multicast MAC address on the particular PDU session comprises providing one or more policy and charging filters to the UPF based on the information that reports use of the multicast MAC address on the particular PDU session.

\* \* \* \* \*